US007734088B2

(12) United States Patent
Bhattacharjya et al.

(10) Patent No.: US 7,734,088 B2
(45) Date of Patent: Jun. 8, 2010

(54) LOW-BANDWIDTH IMAGE STREAMING

(75) Inventors: Anoop K Bhattacharjya, Campbell, CA (US); Victor Ivashin, Danville, CA (US); Kar-Han Tan, Palo Alto, CA (US)

(73) Assignee: Seiko Epson Corporation, Tokyo (JP)

( * ) Notice: Subject to any disclaimer, the term of this patent is extended or adjusted under 35 U.S.C. 154(b) by 819 days.

(21) Appl. No.: 11/622,316

(22) Filed: Jan. 11, 2007

(65) Prior Publication Data

US 2007/0110303 A1 May 17, 2007

Related U.S. Application Data

(63) Continuation-in-part of application No. 11/177,787, filed on Jul. 8, 2005, now Pat. No. 7,330,193.

(51) Int. Cl.
*G06K 9/36* (2006.01)

(52) U.S. Cl. ........................ 382/166; 382/266; 382/275

(58) Field of Classification Search ................. 382/166, 382/266, 275, 169, 232; 353/122, 102, 38; 345/505, 611, 419, 564; 714/734; 385/31; 356/416; 250/227.23; 712/E9.028
See application file for complete search history.

(56) References Cited

U.S. PATENT DOCUMENTS

| | | | | |
|---|---|---|---|---|
| 5,085,506 | A * | 2/1992 | Kahn et al. | 353/122 |
| 5,732,205 | A | 3/1998 | Astle | |
| 6,496,186 | B1 | 12/2002 | Deering | |
| 6,711,299 | B2 | 3/2004 | Chao et al. | |
| 6,791,559 | B2 * | 9/2004 | Baldwin | 345/557 |
| 6,819,793 | B1 | 11/2004 | Reshetov et al. | |
| 2004/0071351 | A1 | 4/2004 | Rade | |
| 2004/0218827 | A1 | 11/2004 | Cohen et al. | |

* cited by examiner

*Primary Examiner*—Anh Hong Do

(57) ABSTRACT

Methods and systems are disclosed for processing image frames to reduce the bandwidth requirements. Embodiment of the present invention may include mode-specific image frame rendering in photorealistic and non-photorealistic modes, such as outline and cartoon modes. In embodiments, update regions may be identified and reduced by an edge position mask. In embodiments, update regions may be bounded by rectangles and such regions may be reduced in number by merging regions together using various no-cost or cost approaches. To improve compressibility, regions to be transmitted that do not require updating at the receiver may be encoded as transparent.

20 Claims, 14 Drawing Sheets

400

500

700

LOW-BANDWIDTH IMAGE STREAMING

CROSS-REFERENCE TO RELATED APPLICATIONS

This application is related to and claims the priority benefit of co-pending and commonly-assigned U.S. patent application Ser. No. 11/177,787, filed on 8 Jul. 2005, entitled "LOW NOISE DITHERING AND COLOR PALETTE DESIGNS," by Anoop K. Bhattacharjya, which is incorporated by reference herein in its entirety.

BACKGROUND

A. Technical Field

The present invention relates generally to the transmission of video images. More particularly, the present invention pertains to reducing the bandwidth required to transmit video images.

B. Background of the Invention

A streaming camera is typically used to share documents between users in, for example, the setting of a videoconference or to otherwise communicate information. However, the use of inexpensive cameras, such as webcams, in such situations may be beset by problems. These problems include low, and often barely adequate, sensor resolution, significant image blur, and high sensor noise. Inexpensive cameras typically are very sensitive to changes in illumination. This leads to undesirable, large-scale pixel changes between successive images in a video stream, even in the presence of only soft shadows, such as those caused by a user moving in the vicinity of the imaging apparatus.

Without further processing, streaming video data from cameras, particularly inexpensive cameras, requires high bandwidth transmissions, but results in the reception of images of only low quality.

Accordingly, what is needed are systems and methods for reducing the bandwidth requirements for a streaming camera.

SUMMARY OF THE INVENTION

Aspects of the present invention includes methods and systems for processing image frames received from a camera, such as a webcam, in order to implement a streaming camera having low bandwidth requirements.

In embodiments, methods and systems embodying teachings of the present invention system reduce pixel noise through temporal edge-preserving filtering, as well as through the use of non-photorealistic rendering modes for representing image frames. Additionally, or in the alternative, such methods and systems lower pixel position noise through the implementation of position masking procedures. In one aspect of the present invention, a low-noise palettizer may be used to encode pixel color. In an embodiment, one color of the palette may be reserved as a "transparent" color for transparency encoding. Embodiments of the methods and systems of the present invention pack changed image regions into rectangles and use transparency encoding to enable the efficient compression of information to be transmitted.

Thus, in one aspect of the invention, a method is provided to obtain low bandwidth transmission of a video stream of plural image frames, each frame being made up of a set of ordered pixels. In the method, the set of pixels across at least some of the plurality of frames are filtered temporally, creating a temporally filtered image frame. Using a stored image frame that reflects the current state of the image frame viewed by a receiver of the video stream, update regions are found in the temporally filtered image frame relative to the stored image frame. In embodiments, rectangle packing may be applied to the update regions before transmission.

In yet another aspect of the present invention a method for the low bandwidth transmission of a video stream involves temporally filtering the set of pixels across at least some of the plurality of image frames to create a temporally filtered image frame, applying mode-specific processing to the temporally filtered image frame, and applying a palettizer to the temporally filtered image frame. The mode-specific processing utilized variously in different embodiments of the inventive technology may include non-realistic processing modes, such as edge outline mode processing and cartoon mode processing, as well as photorealistic mode processing.

The present invention correspondingly includes systems for low-bandwidth transmission of a video stream comprising a plurality of frames. One such system includes a temporal filter capable of converting a frame in the video stream into a temporally filtered image frame, a palettizer that receives a rendered image frame and maps the color values of pixels in the temporally filtered image frame into a palettized image frame using a discrete number of colors, and a palettized image frame buffer in which the palettized image frame is maintained to support further signal processing by the system. Also included in embodiments of the inventive system is a received image frame buffer that maintains a stored image frame that is reflective of the current state of the image frame viewed by a receiver of the video stream. A position mask computer communicating with the frame buffer identifies a set of edge pixels for images in the stored image frame and operates on to the set of edge pixels to produce a position mask that obscures changes in edge pixel positions between the stored image frame and the palettized image frame. An update regions finder communicates with the palettized image frame buffer, the received image frame buffer, and the position mask computer. The update region finder identifies a set of sufficiently-changed pixels in the palettized image frame relative to the stored image frame, and deletes from the set of sufficiently-changed pixels any pixels in the position mask. This produces a reduced set of sufficiently-changed pixels to be updated. In embodiments, the reduced set of sufficiently-changed pixels may be bounded by one or more tightest bounding regions. In an embodiment, the regions may be tightest bounding rectangles that are axis-aligned to a grid that divides the image frame into a set of tiles.

Pursuant to another aspect of a system according to the present invention, a rectangle packer may be coupled to receive from the update regions finder the bounded reduced set of sufficiently-changed pixels. A rectangle packer reduces the number of rectangular update regions by merging pairs of rectangular regions. In an embodiment, the rectangle packer may reduce the number of rectangular regions using a no-cost or a cost-based algorithm. In embodiments, a transparency encoder receives the packed rectangular output and encodes, for better compressibility, the color data for pixels in the packed rectangular output that do not need to be updated as being "transparent." Finally, a compressor may be used to compress the packed rectangular output to be relayed for transmission to a receiver.

Certain features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

The present invention includes methods and systems useful in the processing of image frames received from a camera, such as a webcam, in order to implement a streaming camera having low bandwidth requirements.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different electrical components, circuits, devices, and systems. Components, or modules, shown in block diagrams are illustrative of exemplary embodiments of the invention and are meant to avoid obscuring the invention. Furthermore, connections between components within the figures are not intended to be limited to direct connections. Rather, connections between these components may be modified, reformatted, or otherwise changed by intermediary components.

Reference in the specification to "one embodiment" or "an embodiment" means that a particular feature, structure, characteristic, or function described in connection with the embodiment is included in at least one embodiment of the invention but may be in more than one embodiment. The appearances of the phrase "in one embodiment" in various places in the specification is not necessarily a reference to the same embodiment.

A. Exemplary Embodiments of Systems

Figure 1:
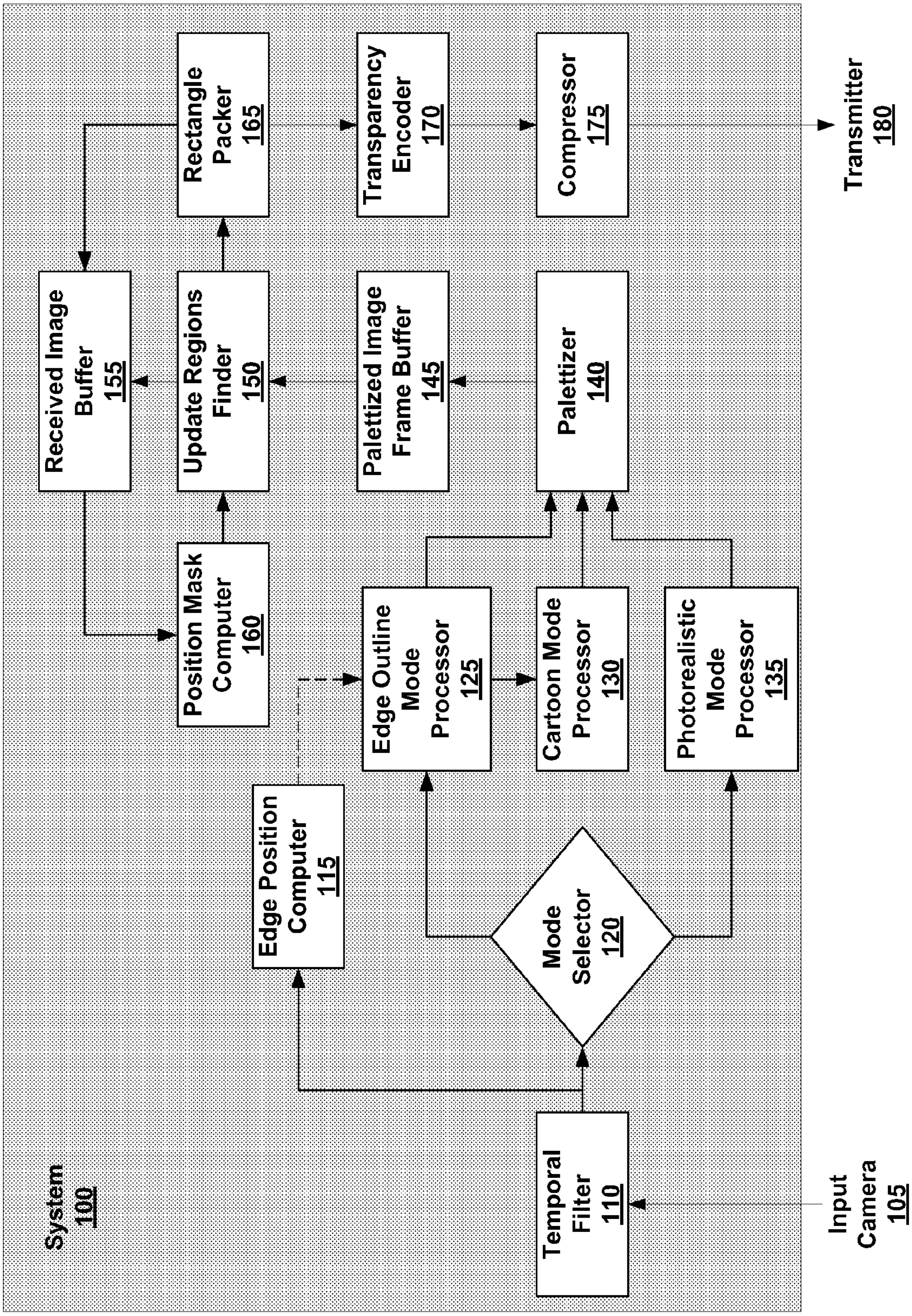
FIG. 1 depicts an embodiment of a system configured in accordance with teachings of the present invention for processing data in a video stream of successive image frames preparatory to the low-bandwidth transmission of the video stream.

The present invention contemplates systems for preparing video image frames for transmission. By way of example and not limitation, FIG. 1 depicts components of an embodiment of a system 100 configured in accordance with teachings of the present invention to process data in a video stream preparatory to the low-bandwidth transmission of the video stream.

System 100 receives a video stream of image frames from an input camera 105, which may be external to system 100. In system 100, the stream of image frames may be temporally filtered by a temporal filter 110 that is capable of converting an image frame in the video stream into a temporally filtered image frame having reduced pixel noise.

In an embodiment, the temporally filtered image frame may be communicated from temporal filter 110 to a mode-specific processing section of system 100. In the mode-specific processing section of system 100, the temporally filtered image frame may be accorded one of several modes of processing. The selection of a particular mode of processing may be selected at the option of an operator of system 100 or may be automatically selected based upon one or more criteria including, without limitation, intended use and bandwidth availability.

Temporally filtered image frames received in the mode-specific processing section of system 100 may be communicated to an edge position calculator or computer 115 that identifies a set of edge pixels in the temporally filtered image frame.

In an embodiment, mode selector 120 directs temporally filtered image frames to one of several mode-specific processors included in the mode-specific processing section of system 100. In the embodiment depicted in FIG. 1, three such mode-specific processors are available to mode selector 120, and temporally filtered image frames may be communicated by mode selector 120 directly to two of these mode-specific processors. As depicted in the embodiment shown in FIG. 1, mode selector 120 may forward a temporally filtered image frame to be conditioned by edge outline mode processor 125, cartoon mode processor 130, or photorealistic mode processor 135. In the depicted embodiment, the cartoon mode processor in the mode-specific processing section of system 100 may receive each temporally filtered image frames indirectly from another of the mode-specific processors, the edge outline mode processor, after processing of the temporally filtered image frames in that mode-specific processor.

The conditioning of a temporally filtered image frame in edge outline mode processor 125 is informed by the set of edge pixels produced in edge position computer 115. In general terms, according to an embodiment, a temporally filtered image frame conditioned in edge outline mode processor 125 will have the appearance of a line drawing rendering of the images contained in the temporally filtered image frame. The precise steps employed by edge outline mode processor 125 to achieve this end will be discussed in more detail below. It should be noted that, relative to the other mode-specific processors, temporally filtered image frames conditioned in edge outline mode processor 125 offer maximum potential benefit for reducing bandwidth requirements.

If cartoon mode has been selected, in an embodiment, image frames conditioned in edge outline mode processor 125 may be presented to cartoon mode processor 130. Alternatively, in an embodiment, cartoon mode processor 130 may communicate directly with mode selector 120 and may perform the same or similar functionality as edge outline mode processor 125. In general terms, according to an embodiment, a temporally filtered image frame conditioned by cartoon mode processor 130 will have the appearance of a line drawing rendering with solid color regions. The precise steps employed by cartoon mode processor 130 to achieve this end will be discussed in more detail below.

Alternatively, if photorealistic images are desired, mode selector 120 may direct temporally filtered image frames for processing by photorealistic mode processor 135. In general terms, according to an embodiment, a temporally filtered image frame conditioned in photorealistic mode processor 135 may be very similar to the corresponding predecessor temporally filtered image frame. In an embodiment, a temporally filtered image frame conditioned in photorealistic mode processor 135 may, according to the embodiment, be a full-information rendering.

In an embodiment, the output of the mode-specific processing section of system 100 may be communicated to a palettizer 140, which maps the color values (which shall be understood to include gray values) of pixels in the conditioned temporally filtered image frame into a palettized image frame using a discrete number of colors. The palettized image frame is then communicated to a palettized image frame buffer 145 to be used in support of further processing by system 100.

Also included in system 100 is a received image frame buffer 155 that maintains a stored image frame that reflects the current state of the image frame viewed by a receiver of the video stream. A position mask computer 160 communicates with received image frame buffer 155 and identifies a set of edge pixels in the stored image frame. A position mask computer 160 operates on the set of edge pixels to produce a position mask that may obscure some changes in edge pixel positions between the stored image frame in received image frame buffer 155 and the palettized image frame in palettized image frame buffer 145.

An update regions finder 150 communicates with palettized image frame buffer 145, received image frame buffer 155, and position mask computer 160. Update regions finder 150 identifies a set of sufficiently-changed pixels in the palettized image frame as compared with the stored image frame. In update regions finder 150, pixels in the position mask from position mask computer 160 may be deleted from the set of sufficiently-changed pixels. The result is an inventory of regions that are to be updated in the stored image frame using data from corresponding regions in the palettized image frame.

In another aspect of system 100, a rectangle packer 165 may be coupled to receive from update regions finder 150 the inventory of regions to be updated. Rectangle packer 165 may reduce the number of rectangular update regions by merging rectangular update regions. In embodiments, the action of rectangle packer 165 may be iterative, and rectangle packer 165 may continue by merging rectangular update regions until no further mergers are possible. Unmerged rectangular update regions, if any, and packed rectangular update regions, if any, are the output of rectangle packer 165.

In embodiments, a transparency encoder 170 may receive the output of, or may function in conjunction with, the rectangle packer 165 and marks as transparent the color data for pixels in the packed output that do not require updating but are a part of an update region. In an embodiment, the update regions may be supplied to a compressor 175 to compress the data immediately prior to transmission by a transmitter 180 to a receiver. In an embodiment, compressor 175 may be part of transmitter 180.

B. Exemplary Embodiments of Methods

Figure 2:
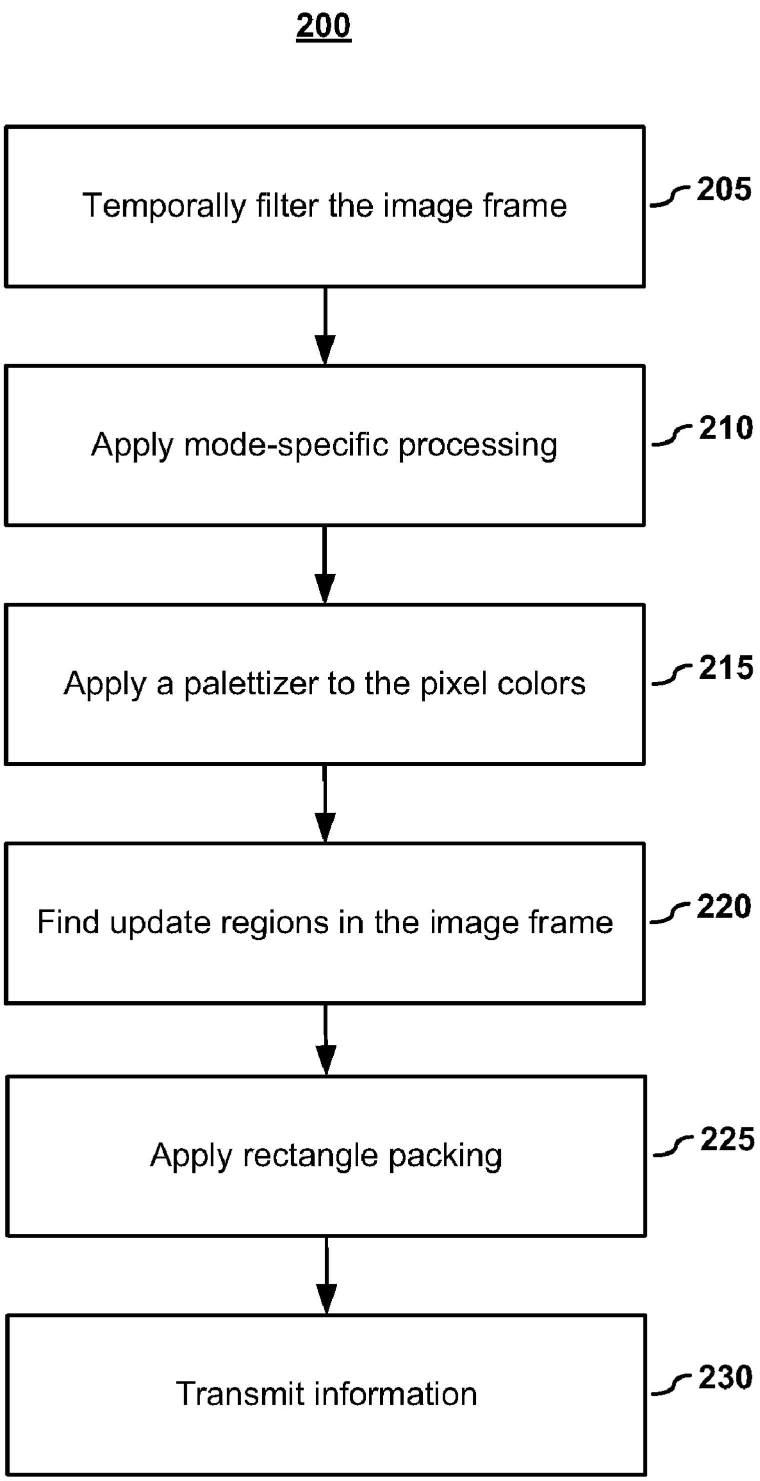
FIG. 2 is a flow chart of an embodiment of a method which may be implemented by the system of FIG. 1.

Depicted in FIG. 2 is an embodiment of a method 200 informed by teachings of the present invention to enable low bandwidth transmission of a video stream of image frames. As shown in FIG. 2, an image frame may be temporally filtered (205) using an edge-preserving temporal filter to help reduce pixel noise. Mode-specific processing (210) may then be applied to the temporally filtered image frame, which corresponds to the activity conducted by the mode-specific processing section of system 100 in producing an edge outline mode output, a cartoon mode output, or a photorealistic mode output.

A palettizer may be applied (215) to the color of the pixels in the conditioned temporally filtered image frame produced by the mode-specific processing section of system 100. This step results in a palettized image frame and may be performed by palettizer 140 of system 100. The palettized image frame may be used to find (220) pixels in the palettized image frame that need to be updated relative to corresponding pixels in a stored image frame that reflects the state of the image frame viewed by a receiver of the video stream being transmitted by system 100.

In the depicted embodiment, rectangle packing procedures may be applied (225) to the update regions. This results in a packed output that may be transmitted (230) to a receiver of the video stream.

The operations of selected portions of system 100 will be explored in more detail below in order to more fully illuminate the steps undertaken in method 200.

1. Temporal Filtering

Image frames received from the camera may be temporally filtered to reduce pixel noise. In an embodiment, an edge-preserving temporal filter may be used. In an embodiment, spatial filtering for noise reduction may be optionally performed. Because inexpensive cameras do not generally have high spatial resolution, in a document streaming situation in particular, sacrificing spatial resolution through spatial filtering may severely affect the readability of small fonts. In embodiments where high-resolution cameras are used, edge-preserving spatial filters may be employed in conjunction with temporal filtering.

Figure 3:
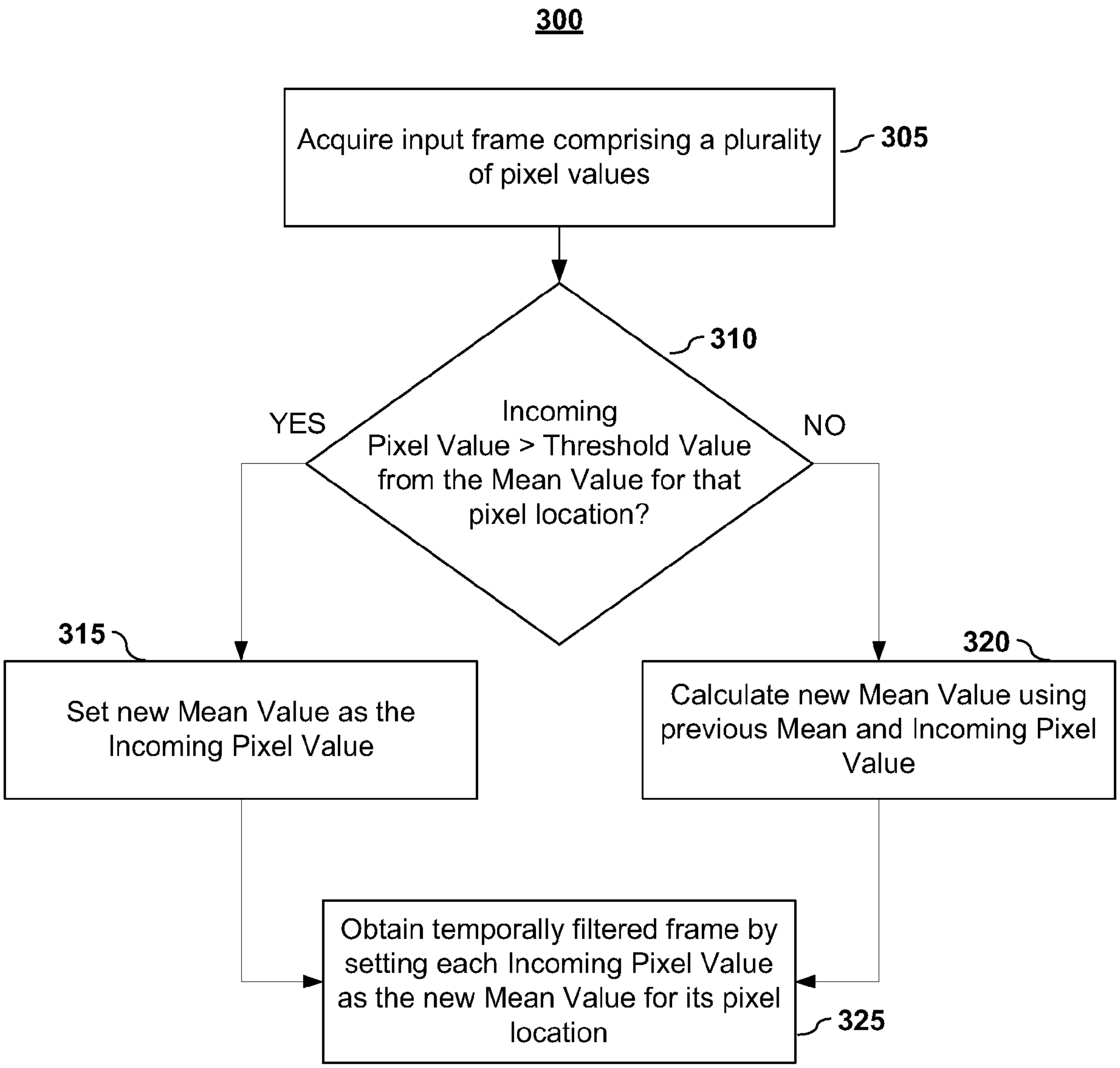
FIG. 3 is a flow chart depicting an embodiment of a method for temporally filtering an image frame according to an embodiment of the present invention.

One embodiment of temporal filtering that may be performed by temporal filter 110 is set forth in FIG. 3. As indicated in box 305, temporal filtering method 300 commences by acquiring an input image frame from a camera 105. Each input image comprises a plurality of pixels. To perform an embodiment of temporal filtering, the mean color value of each pixel is tracked over a plurality of input frames, producing a mean color value for each pixel location. If the incoming pixel color value at a given pixel location exceeds (310) the mean color for that pixel location by a threshold value, the mean color value for that pixel location is replaced by the incoming pixel color value for that pixel location, resulting in a new mean color value for that pixel location. If the incoming pixel color value is within a threshold value of the mean value, the incoming pixel color value is combined with the mean value to obtain a new mean color value for that pixel location. A temporally filtered frame is generated (325) by setting each pixel color value in the input frame to the new mean pixel color value for each pixel location, which was obtained according to temporal filtering method 300.

In an embodiment, the threshold value may be related to the noise of the camera sensors. The noise level of the camera sensors may be determined, in an embodiment, by having the camera view a solid color image and calculating the mean and variance of the pixel color values. In one embodiment, the threshold value may be related to the mean plus a factor multiplied by the variance. One skilled in the art will recognize other ways to estimate or calculate residual noise and for setting a threshold value; none of which are critical to the practice of the present invention.

An embodiment of temporal filtering is described in general mathematics below. Let $c_{ij}^t$, denote the color of the pixel at location (i, j) in the image frame received at time t. Let the mean color at location (i, j) be denoted by the tuple ($s_{ij}^t$, $n_{ij}^t$), where $n_{ij}^t$ denotes the number of samples that were averaged temporally to obtain the sum $s_{ij}^t$. Denoting the filtered mean color at location (i, j) at time t by $\mu_{ij}^t$ results in the following relationship:

$$\mu_{ij}^t = \frac{s_{ij}^t}{n_{ij}^t} \tag{1}$$

Denoting the predetermined color-difference threshold by $C_T$, the temporal filtering operation may be given by:

$$\mu_{ij}^{t+1} = (s_{ij}^{t+1}, n_{ij}^{t+1}) = \begin{cases} (s_{ij}^t + c_{ij}^t, n_{ij}^t + 1) & \text{if } \left\| \frac{s_{ij}^t}{n_{ij}^t} - c_{ij}^t \right\| < C_T \\ (c_{ij}^t, 1) & \text{otherwise.} \end{cases} \tag{2}$$

The temporally filtered image comprises $\mu_{ij}^{t+1}$ for each pixel location (i, j).

2. Edge Position Computation

In an embodiment, edge positions in the temporally filtered image frame may be identified by examining the pixel color values within a causal neighborhood of each pixel location (i, j). In an embodiment, the causal neighborhood of pixel location (i, j) may be defined as the set of pixel locations given by:

$$CN(i,j)=\{(i,j+1), (i+1,j-1), (i+1,j), (i+1,j+1)\} \tag{3}$$

For all locations (i, j) and a predefined threshold, $E_T$, if $\|\mu_{ij}^t - \mu_{pg}^t\| > E_T$ for some p, q) ∈ CN(i, j), then, the edge location may be given by:

$$\text{Edge Location} = \begin{cases} (i, j) & \text{if Lightness}(\mu_{ij}^t) < \text{Lightness}(\mu_{pq}^t) \\ (p, q) & \text{otherwise.} \end{cases} \tag{4}$$

One skilled in the art shall recognize other methods for determining edge pixels, which methods fall within the scope of the present invention.

3. Mode-Specific Processing

Embodiments of the present invention may allow for multiple rendering modes, which will be explained in more detail below. By way of overview, it should be noted that only one mode of processing involves a full-information rendering of the temporally filtered image frame. Full-information rendering occurs in the photorealistic mode of processing, which may be performed by photorealistic mode processor 135.

The other modes of processing may be non-photorealistic modes. In such modes, selected data is suppressed from the temporally filtered image frame being processed so that a reduced-information rendering results. The non-photorealistic modes of processing available in the mode-specific processing section of system 100 may include the edge outline mode, which may be performed by edge outline mode processor 125, and the cartoon mode, which may be performed by cartoon mode processor 130.

In an embodiment, the temporally filtered image buffer ($\mu_{ij}^t$) is updated for all input image frames ($c_{ij}^t$). When system 100 needs to transmit a frame to a receiver, system 100 or a user may specify a rendering mode in which to send the corresponding image data. It shall be noted that the rates of camera input and output to the receiver need not be same, and may even by asynchronous. When a frame request is received for an image frame to be transmitted to the receiver, the image data in $\mu_{ij}^t$ may be processed based on one of the modes of processing available in the mode-specific processing section of system 100. Each mode will be discussed in additional detail below.

a) Edge Outline Mode

Figure 4:
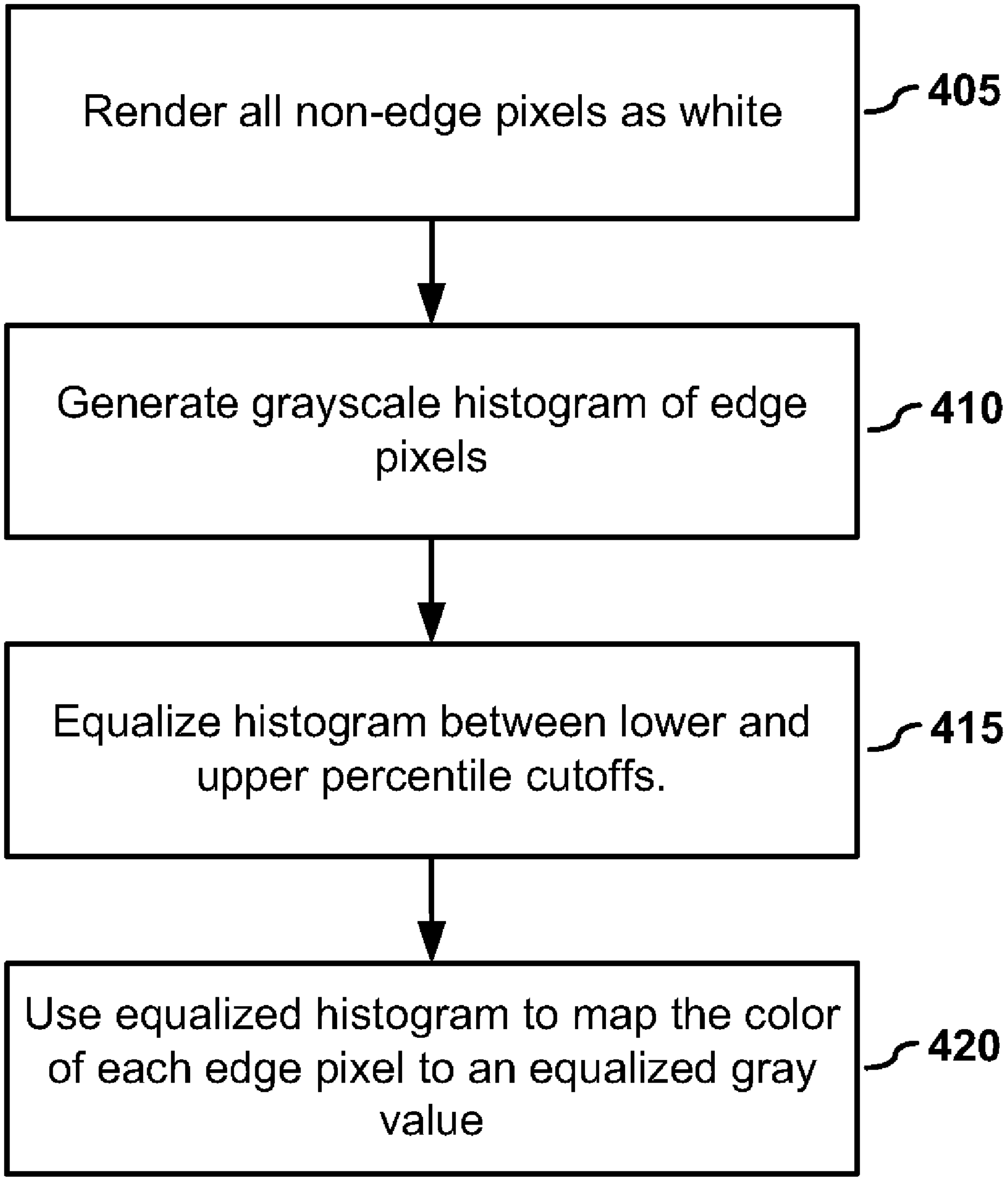
FIG. 4 is a flow chart depicting a first embodiment of a method for applying mode-specific processing.

Edge outline processing is a non-photorealistic mode. FIG. 4 depicts an embodiment of a method for rendering an edge outline image according to an embodiment of the present invention. In an embodiment, all pixels that are not labeled as edge pixels may be rendered (405) as white. A grayscale histogram may be generated (410) of the edge pixels in the rendered image frame. In an embodiment, this histogram may then be equalized (415) between lower and upper percentile cutoffs to produce an equalized histogram. The equalized histogram may be used to map (420) the color of each edge pixel to an equalized gray value.

Such a grayscale image is highly compressible and may be transmitted to a receiver using less bandwidth. The edge outline mode employs strong quantization while maintaining a smooth visual impression of the strength of an edge and thereby achieves improved compression.

b) Cartoon Mode

Figure 5:
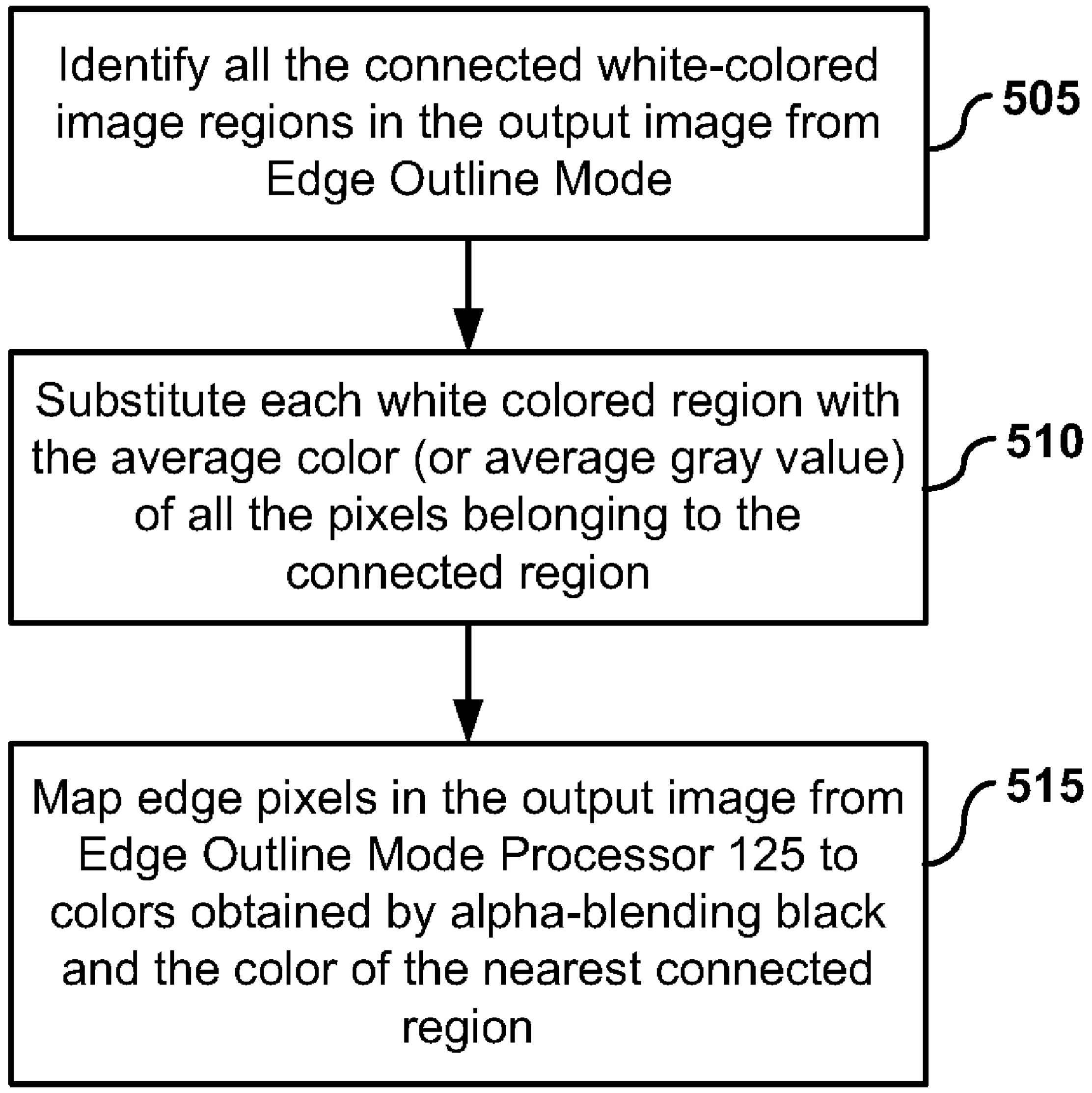
FIG. 5 is a flow chart depicting a second embodiment of a method for applying mode-specific processing.

Cartoon mode processing is a non-photorealistic color or grayscale mode. In an embodiment, the output of edge outline mode may be the input of the cartoon mode. Thus, as indicated in FIG. 5, cartoon processing method 500 may commence by identifying (505) all the connected white-colored image regions in the output image of the edge outline mode. In an embodiment, each white-colored region may be substituted (510) by the average color or average gray value of all of the pixels in that connected component region. In embodiments, the average color may be the mean, median, or mode of the region. Finally, non-white, or edge, pixels in the edge outline mode image may be mapped (515) to colors obtained by alpha-blending black with the color of the nearest connected region. In an embodiment, for example, if an edge is three pixels wide and separates two regions, r1 and r2, the color of the edge pixel closest to r1 will be blended with the color of region, r1, the color of the edge pixel closest to region, r2, will be blended with the color of region, r2, and the middle edge pixel's color is unchanged.

Cartoon processing method 500 yields an image with solid colors or grays for each of the connected regions that are separated from each other by black or gray boundaries. In an embodiment, to improve compression efficiency the mean color of each component region may be mapped to the closest color in a palette used by a palettizer, such as palettizer 140.

The cartoon mode of processing employs strong quantization and thereby achieves improved compression.

c) Photorealistic Mode

Figure 6:
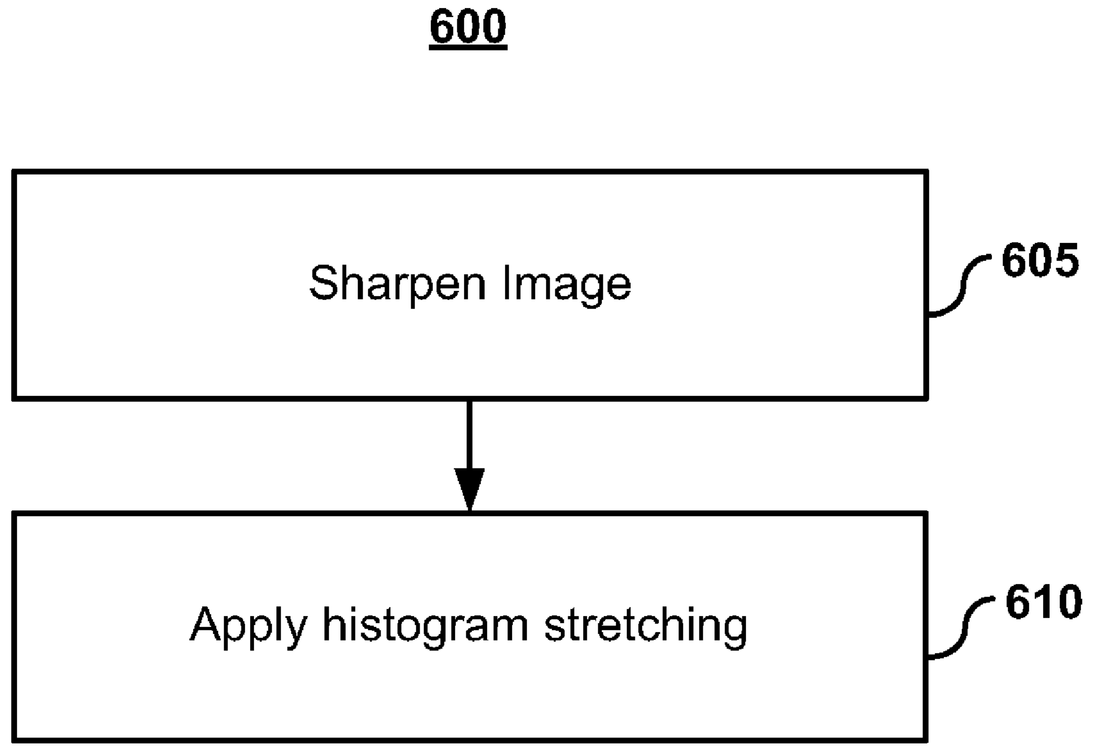
FIG. 6 is a flow chart depicting a third embodiment of a method for applying mode-specific processing.

Photorealistic processing produces a high-bandwidth, full-information color or grayscale rendering. FIG. 6 depicts an embodiment of a method 600 which may be used for processing an image frame to obtain a photorealistic image, according to an embodiment of the present invention. As set forth in FIG. 6, the temporally-filtered images may be sharpened (605), and a color histogram stretching operation or operations may be performed (610) to reduce the effects of camera blur. In an embodiment, the photorealistic image may also be compressed to a smaller set of colors using a palettizer.

4. Palettizing

In an embodiment, a palettizer may be applied to the image outputted from the mode-specific processing section. In an embodiment, the palettizer may comprise a look-up table that converts an image color into a color or set of colors. In embodiments, a palettizer such as described in U.S. patent application Ser. No. 11/177,787, filed on 8 Jul. 2005 and entitled, "LOW NOISE DITHERING AND COLOR PALETTE DESIGNS" may be employed; the subject matter of which is incorporated by reference herein in its entirety.

5. Finding Update Regions

Figure 7:
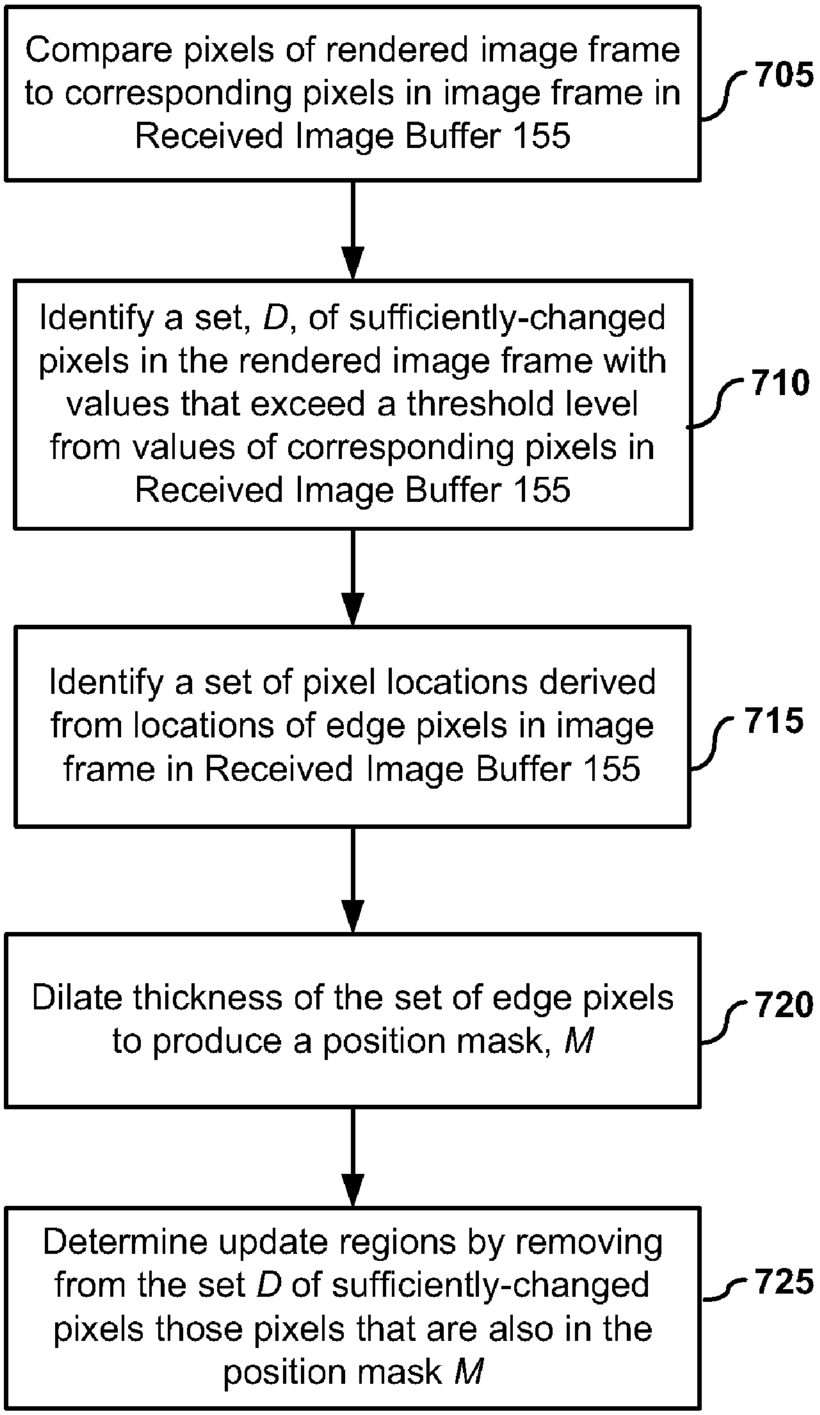
FIG. 7 is a flow chart depicting an embodiment of a method for finding update regions in an image frame.

FIG. 7 depicts an embodiment of method for finding update regions according to an embodiment of the present invention. Based on a record of data transmitted to a receiver, a received image frame that reflects the current state of the image frame viewed by the receiver is maintained in received image frame buffer 155. Pixels in the received image frame in received image frame buffer 155 may be compared (705) against the corresponding pixels in a rendered image frame. In an embodiment, the rendered image frame may be the palettized image frame produced by palettizer 140. As a result of this comparison, it is possible identify (710) a set, D, of sufficiently-changed pixels in the palettized image frame that differ by a predefined threshold level from the corresponding pixels in the received image frame and, therefore, should be communicated to the receiver.

Before so doing, however, it should be noted that the images in the rendered image frame may be sensitive to pixel position noise, especially near image edges. This noise may be counteracted by using a position mask to obscure pixels that are proximate to the edges in the image. In this manner, pixels near image edges may be precluded from being transmitted to the receiver.

In an embodiment, a position mask may be developed by position mask computer 160, which determines a set, M, of pixels around the edges in the received image frame. A set of pixel locations may be derived (715) from the locations of edge pixels in the received image frame in received image frame buffer 155. A morphological operator may then be applied to that set of edge pixels to thicken (720), or dilate, the edge boundaries. Such a process results in a set, M, of pixels that may be used as an edge mask of the positions of the edges of images in the received image frame. Pixels that are located within the edge mask may be precluded from being transmitted to a receiver. Thus, the set, D, of pixels may be reduced (725) by the set, M, to identify (725) update regions that may be updated to the receiver.

Stated below in mathematical terms is an embodiment of a method for identifying update regions using an edge mask. Let the set, D, denote the set of pixel locations that are sufficiently different between the image stored in the palletized image frame buffer and the image frame that reflects the state of the receiver's image frame based on the data transmitted to the receiver. A set of masked locations, M, may be derived from the locations of the edges in the copy of the receiver's buffer. Specifically, let $r_{ij}^{t}$ denote the colors of the pixels in the copy of the receiver's buffer. For all locations, (i, j), and a predefined threshold, $M_T$, if $\|r_{ij}^{t}-r_{pq}^{t}\|>M_T$, for some $(p, q) \in CN(i, j)$ (as defined in Equation 3, above), then, $(i, j) \in M$ and $(p, q) \in M$.

Thus, the set of sufficiently-different pixels, D, may be reduced to D−M using the set of masked pixel locations, M, to obtain reduced set of sufficiently-different pixels, R. This reduced set of sufficiently-different pixels, R, represents the pixel locations that should be updated on the receiver. It shall be noted that using masked positions reduces bandwidth and provides stable text/graphics/image boundaries in the presence of pixel-position noise and quantization noise.

6. Region Bounding

Figure 8:
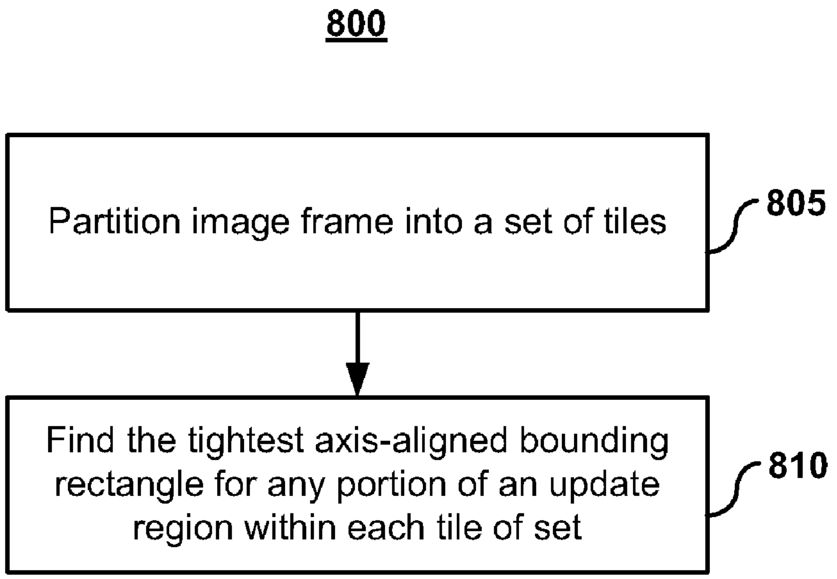
FIG. 8 is a flow chart depicting an embodiment of a method for identifying rectangular update regions.

In embodiments, the reduced set of sufficiently-different pixels, R, may be partitioned for further processing to achieve additional bandwidth efficiencies. FIG. 8 depicts an embodiment 800 for update region bounding. In an embodiment, the image frame may be partitioned (805) into regions, which regions may comprise a predefined tile of rectangles.

Figure 9A:
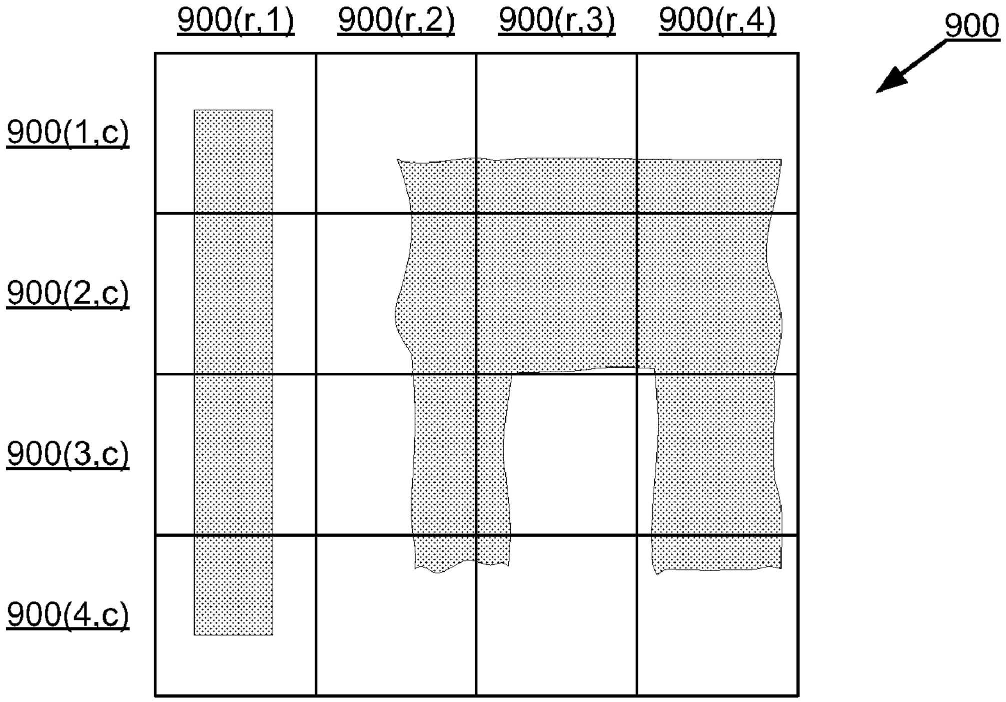
FIGS. 9A and 9B are a sequence of diagrams illustrating an embodiment of a method for identifying update regions in an image frame.

FIG. 9A depicts an embodiment of a palettized image frame 900, which has been divided into a number of rectangular regions 900(r,c). More particularly, in the embodiment shown in FIG. 9A, the palettized image frame 900 has been partitioned into a four-by-four matrix of tiles 900(1,1) through 900(4,4). It shall be noted that the particular shape, number, and size of the tiles are not critical to the present invention. Also depicted in FIG. 9A are shaded regions that represent the locations of the reduced set of sufficiently-different pixels, R. By contrast, the non-shaded regions in palettized image frame 900 represent pixels that do not warrant transmission to a receiver, which pixels may comprise insufficiently-different pixels and pixels that were excluded by the edge mask.

For each tile 900(r,c) that possesses any pixels from the reduced set of sufficiently-different pixels, R, a tightest axis-aligned bounding rectangle is found (810). A tightest axis-aligned bounding rectangle will be the smallest rectangle that has sides parallel to the respective axes of the matrix by which palettized image frame 900 was partitioned, and that bounds all of the pixel positions in that tile that are part of the update region, R. In an embodiment, a tile may contain more than one tightest axis-aligned bounding rectangle. It shall be noted that by using axis-aligned bounding rectangles rather than searching over all possible orientations provides for rapid processing, which can be beneficial when having to process video data. One skilled in the art shall recognize that other implementations, such as using non-axis-aligned bounding regions, may be employed.

Figure 9B:
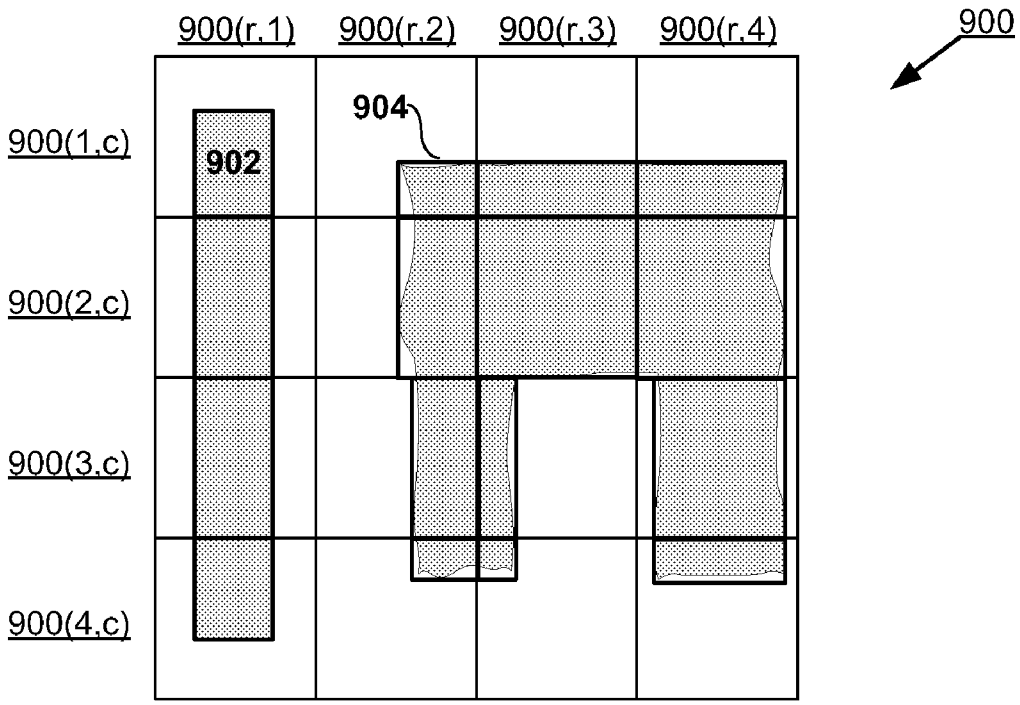

It shall be noted that the tightest axis-aligned bounding rectangle may enclose pixel that are not part of the update region, R. Consider, by way of illustration, FIG. 9B which depicts the image frame 900 of FIG. 9A after the tightest axis-aligned bounding boxes have been determined for each tile. Note that the tightest axis-aligned bounding rectangle 902 in tile 900(1,1) coincides exactly with the update region within that tile. Consider, however, the tightest axis-aligned bounding rectangle 904 for tile 900(1,2). Due to the irregular shape of the portion of the update region within tile 900(1,2), the tightest axis-aligned bounding rectangle 904 contains some pixel (the unshaded pixels) that are not part of the update region (the shaded pixels).

In an embodiment, the bounding rectangles may be ordered in decreasing order of the number of pixel locations that they contain that also belong to the reduced set of sufficiently-different pixels, R. In an embodiment, based on bandwidth conditions, bounding rectangles that do not contain more than a defined percentage of altered pixels, may be transmitted to the receiver at a slower rate. In an embodiment, low-percentage bounding rectangles may be sent on a round-robin basis so that all regions that need to be updated are guaranteed to be updated at a preset rate.

In an embodiment, as will be explained in more detail below, portions of a bounding rectangle that do not belong to the reduced set of sufficiently-different pixels, R, may be encoded with a "transparent" color to improve compressibility of the transmitted bounding region.

7. Rectangle Packing

According to embodiments of the present invention, given a set of axis-aligned bounding rectangles as described in the previous section, it may be beneficial to reduce the number of rectangles that cover the reduced set of sufficiently-different pixels, R. By reducing the number of rectangles, the overall transmission cost of sending updated image regions to the receiver may be reduced. Many rectangle packing algorithms are known to those of skill in the art or may be obtained or adapted from other arts, such as, by way of non-limiting example, semiconductor manufacturing. Such methods shall be considered within the scope of the present invention.

In an embodiment, the expense in processing and transmitting a given set of rectangles, $S_R$, may depend upon three factors: the total number of rectangles, $N_R$; the total area with content (areas with update regions), $A_C$, that is covered by the given set of rectangles, $S_R$; and the total area with no content (areas without update regions), $A_N$, but that may be inexpensive to transmit. A cost function of the above embodiment may be expressed as:

$$\text{Cost}=(A\times N_R)+(B\times A_C)+(C\times A_N), \quad (5)$$

where, A, B, and C, represent the unit cost for each term. These unit costs may be affected by or related to such factors as the compression algorithm used by the system, packetizing scheme, and the like.

8. No-Cost Packing

In Equation 5, it should be noted that the area with content, $A_C$, is constant since it is necessary to transmit all areas that have update regions. This means that the area with content, $A_C$, never decreases and since there are no other update regions in the image frame, the area with content, $A_C$, never increases. Because the area with content, $A_C$, is a constant, in an embodiment, the term $(B\times A_C)$ may be treated as a constant. Accordingly, the following cost function may be optimized:

$$\text{Effective Cost}=(A\times N_R)+(C\times A_N). \quad (6)$$

Typically, some rectangles may be packed, or merged, together without introducing any area that does not have content. When rectangles merge without introducing new areas with no content, such mergers reduce the cost of transmission without occurring increased costs; such procedures may be referred to as "no-cost" rectangle packing.

In no-cost rectangle packing, each merged rectangles encloses no more area than the total of the areas enclosed individually by the original set of bounding rectangles. Rectangles that may be merged for no-cost rectangle packing are adjacent to each other, either horizontally or vertically. If adjacent horizontally, the rectangles must share the same top and bottom coordinates to become packed into a merged rectangle; if adjacent vertically, the rectangles must share the same left and right coordinates.

Figure 10:
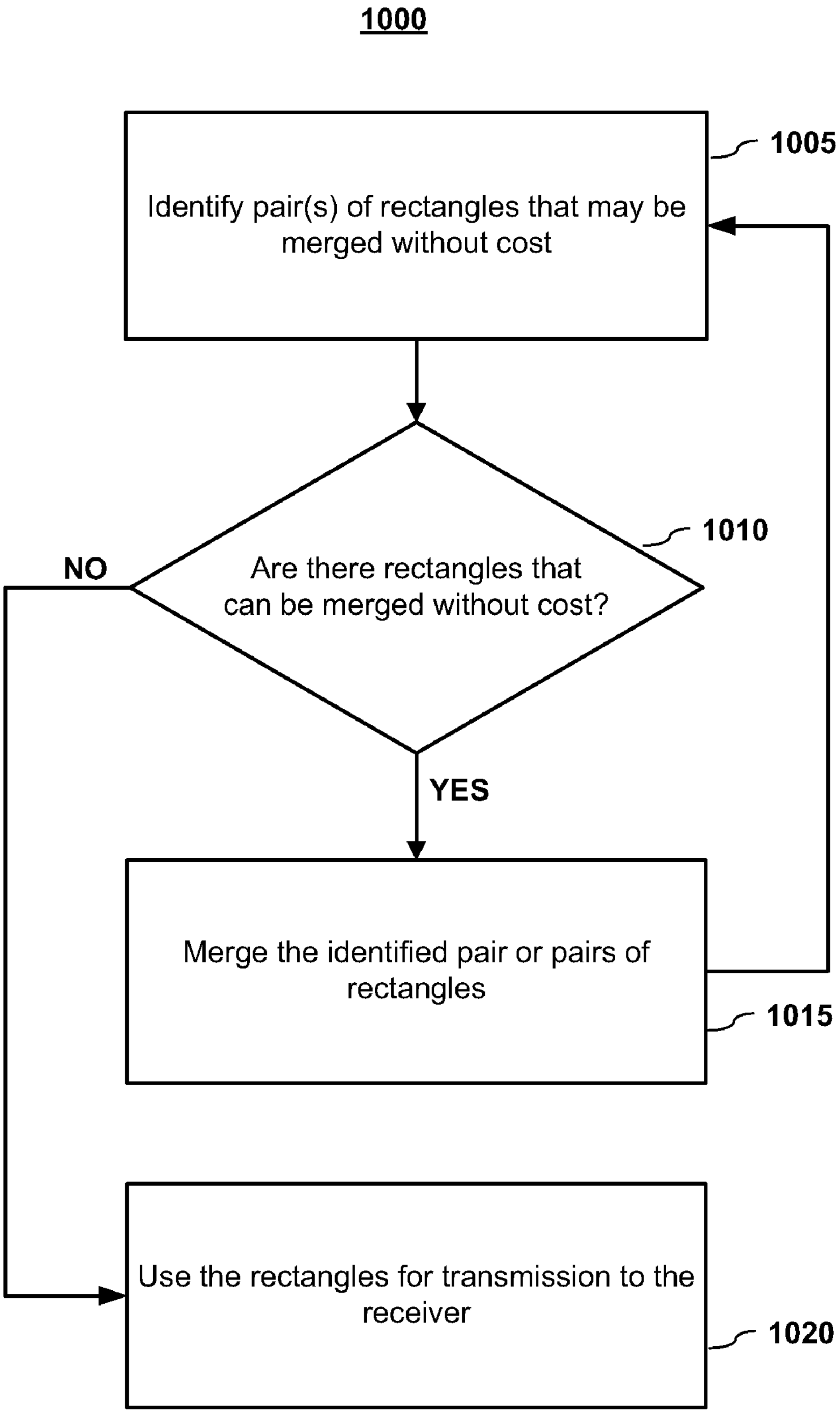
FIG. 10 is a flow chart depicting a first embodiment of a method for applying rectangle packing.

An embodiment of a method for no-cost rectangle packing is presented in FIG. 10. In an embodiment, the no-cost rectangle packing method 1000 may follow update rectangle bounding method 800. In the depicted embodiment, an algorithm 1000 may be used that incrementally merges pairs of rectangles that are adjacent and share the same opposing boundary coordinates—that is, they share the same top and bottom coordinates if adjacent horizontally, or share the same left and right coordinates if adjacent vertically. During each iteration, the algorithm may examine (1005) all pairs of rectangles to ascertain (1010) whether they can be merged without cost, and merges (1015) pairs that can be merged without cost. The algorithm repeats using merged rectangles and any remaining unmerged rectangles from the original set of bounding rectangles, until no more merges are possible.

Figure 11A:
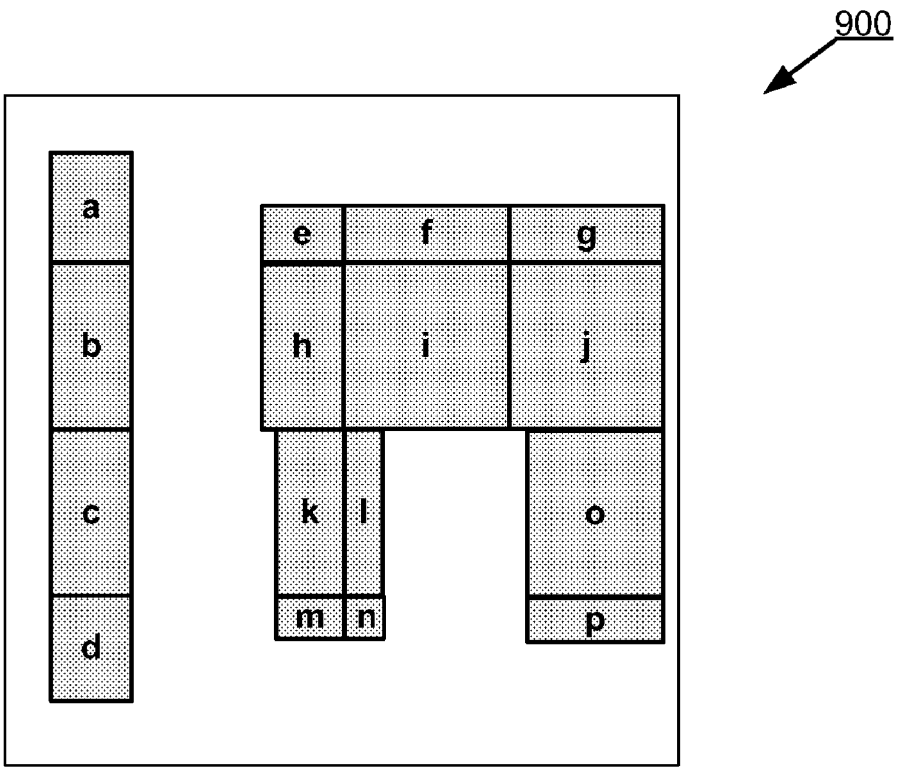
FIGS. 11A and 11B are a sequence of diagrams illustrating the consequence to an image frame of performing rectangle packing according to an embodiment of the invention.
Figure 11B:
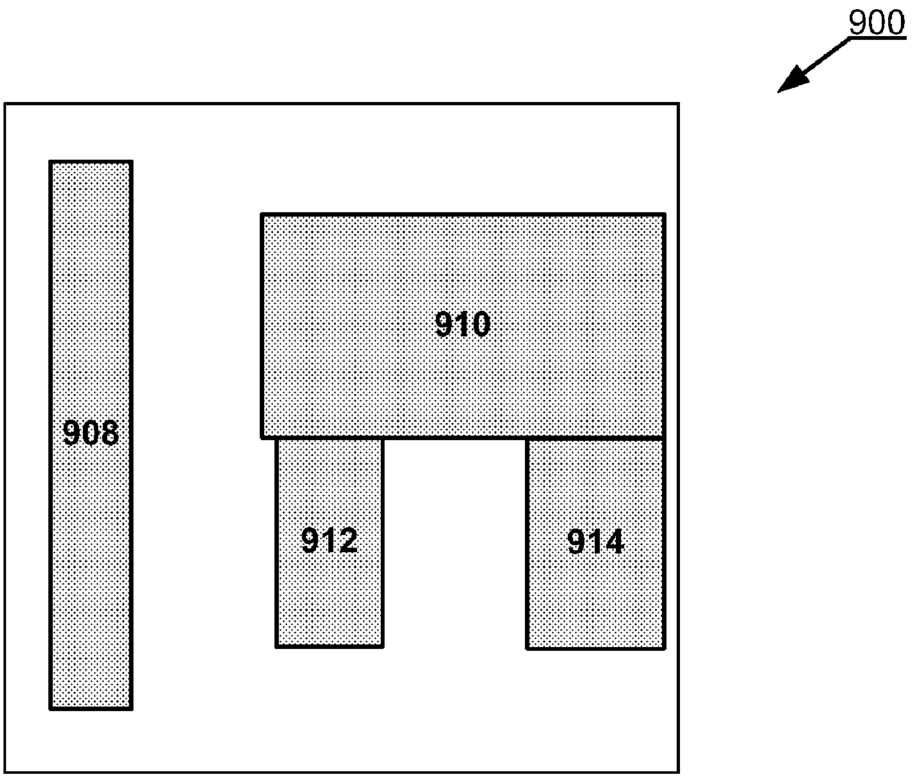

By way of illustration, consider the set of tightest axis-aligned bounding rectangles (a-p) in palettized image frame 900 as shown in FIG. 11A. The effect of a no-cost rectangle packing operation on the set of tightest axis-aligned bounding rectangles is depicted in FIG. 11B. Note, for example, that rectangles a-d were merged to form rectangle 908, rectangles e-j were merged to form rectangle 910, rectangles k-n were merged to form rectangle 912, and rectangle o and rectangle p were merged to form rectangle 914.

Ultimately, as set forth in FIG. 10, once the iterative process has completed, the resulting rectangles may be used (1020) for transmission to the receiver. Alternatively, the rectangles may be used in a cost-based packing algorithm. It shall be noted that these rectangles, which may also be referred to as the packed rectangles, may comprise the same number of rectangles (if none of the axis-aligned bounding rectangles were able to be merged), merged rectangles, or a combination merged rectangles and unmerged tightest axis-aligned bounding rectangles.

9. Cost-Based Packing

In embodiment, rectangular update areas may be merged with areas that do not require updating ("non-update" regions), if the benefit of including the area with no content offsets the cost of including them. A rectangle packer that includes areas with no content that needs to be updated will hereinafter be referred to as "cost-based" rectangle packer, and any rectangles that merge with an area that has no update content will be referred to a "cost-based" rectangle.

In an embodiment of cost-based rectangle packing, an algorithm may be used that evaluates or otherwise optimizes the costs of replacing an update region or regions with a cost-based rectangle that includes at least one non-update region. In one embodiment, the cost-based rectangle packer may evaluate the cost of a potential cost-based rectangle and may iterate until a cost-base rectangle is identified that has a benefit that exceeds its cost. Alternatively, the cost-based rectangle packer may iterate through all possible cost-based rectangles and select the cost-based rectangle with the best benefit in excess of its costs. As with the no-cost approach, in an embodiment, the cost-based rectangle packer may repeat until no more cost-based rectangle replacements are possible.

Figure 12:
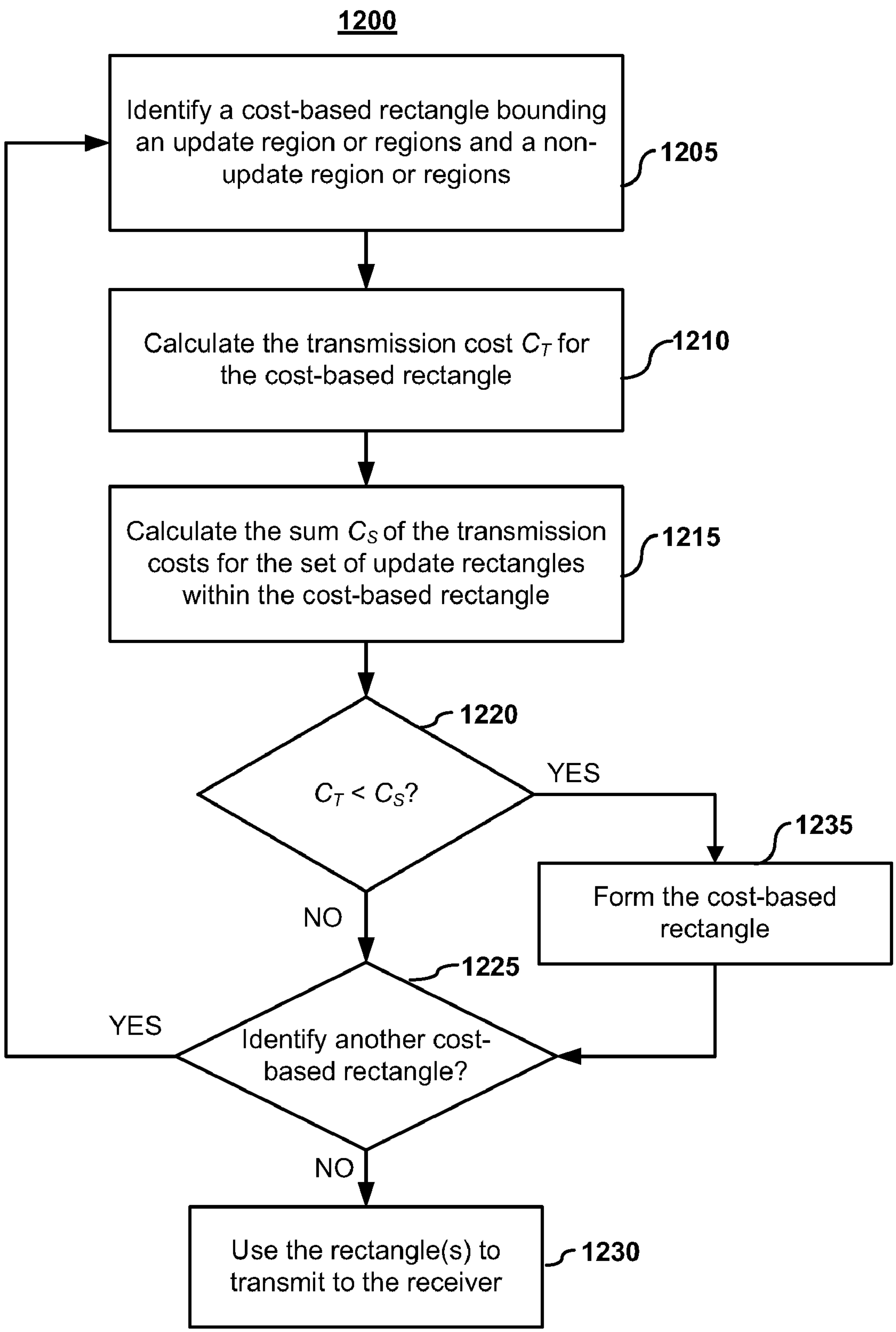
FIG. 12 is a flow chart depicting a second embodiment of a method for applying rectangle packing.

FIG. 12 depicts an embodiment of a method 1200 for cost-based rectangle packing. In an embodiment, cost-based rectangle packing method 1200 may follow a no-cost rectangle packing process and operate upon the results obtained therefrom.

As depicted in FIG. 12, cost-based rectangle packing method 1200 commences by identifying (1205) a candidate cost-based rectangle that bounds an update region or regions and an non-update region or regions. The transmission cost, $C_T$, for that candidate cost-based rectangle is calculated (1210). The total transmission cost, $C_S$, is determined (1215) for the update regions within the candidate cost-based rectangle. It shall be noted that the activities performed in box 1215 may be performed simultaneously with the activities required by box 1205; they may also be performed prior to the activities required by box 1205.

The two costs, $C_T$ and $C_S$, may then be compared (1220) to ascertain whether using the cost-based rectangle is cost-effective. If it is more cost effective, the cost-based rectangle packing may be formed (1235) by merging the regions.

If the cost-based rectangle is not cost effective, a determination may be made (1225) to identify another candidate cost-based rectangle. If there is no attempt to identify a new candidate cost-based rectangle or if no new candidate cost-based rectangle can be identified, the resulting rectangles may be used to transmit (1230) to a receiver. The resulting rectangles may comprise cost-based rectangle(s), original axis-aligned bounding rectangle(s), merged rectangle(s), or a combination thereof.

Figure 13A:
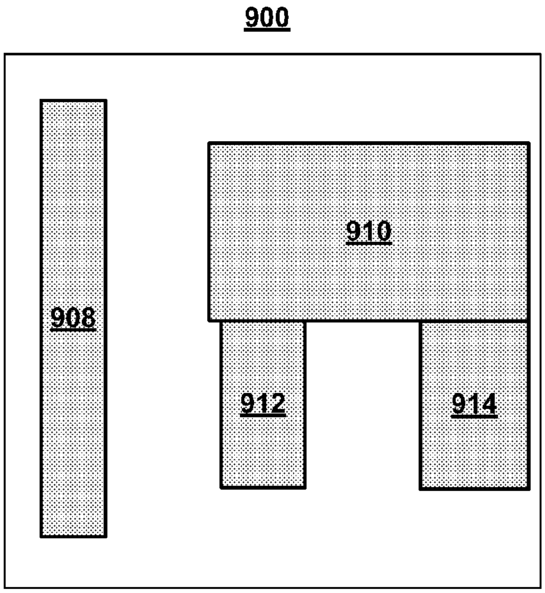
FIGS. 13A-13D are sample image frames illustrating methods for applying rectangle packing according to embodiments of the present invention.

By way of illustration, exemplary results of cost-based rectangle processing are shown in FIGS. 13A-13D. FIG. 13A depicts a set of merged tightest axis-aligned bounding rectangles 908, 910, 912, and 914, which appeared in FIG. 11B. The effect of a cost-based rectangle packing method on that set of merged tightest axis-aligned bounding rectangles is observable in the changes in transforming image frame 900 shown in FIG. 13A into image frame 900 shown in FIG. 13D. Those changes are a consequence of the evaluation of a pair of candidate cost-based rectangles depicted, respectively, in FIGS. 13B and 13C.

Figure 13B:
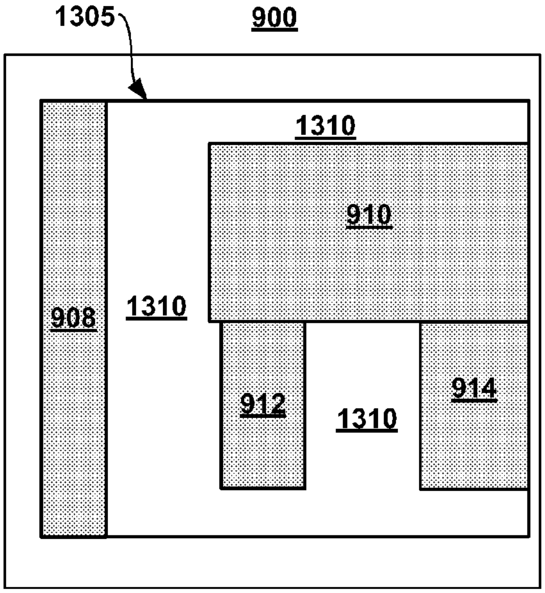

FIG. 13B depicts a first candidate cost-based rectangle 1305 that bounds all of merged update rectangles 908, 910, 912, and 914, as well as an irregular, non-update region 1310. Although the number of update rectangles is reduced to one, a substantial non-update region 1310 is included. In this embodiment, this first candidate cost-based rectangle shown in FIG. 13B proved unsatisfactory. The transmission costs for cost-based rectangle 1305 were greater than the costs of transmitting the four regions 908, 910, 912, and 914.

Figure 13C:
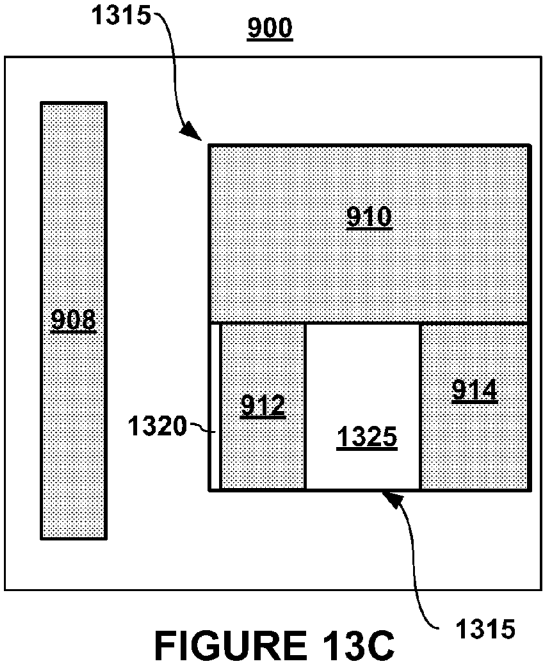
Figure 13D:
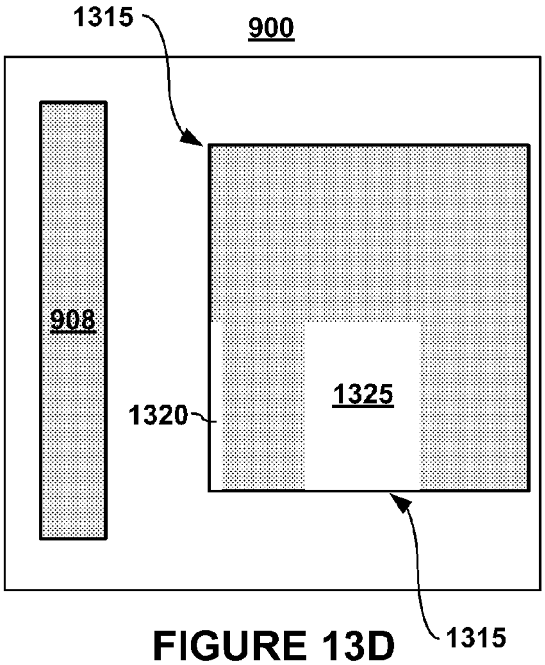

By contrast, a second candidate cost-based rectangle is depicted in FIG. 13C that illustrates, by way of example, a cost-based rectangle with a benefit that exceeded its costs. Cost-based rectangle 1315 bounds update rectangles 910, 912, and 914, as well as non-update regions 1320 and 1325. The number of update rectangles is reduced from four to two and only relatively small non-update regions 1320 and 1325 are included in the cost-based rectangle. The cost of transmitting the two rectangles 908 and 1315, despite the inclusion of non-update regions 1320 and 1325, is less costly than transmitting rectangles 908, 910, 912, and 914.

10. Rectangle Transmission

Figure 14A:
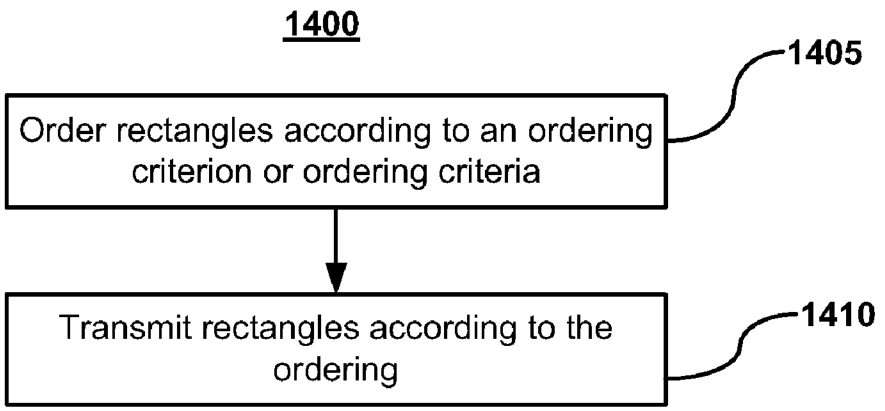
FIG. 14A is a flow chart depicting a first embodiment for transmitting information according to an embodiment of the invention.
Figure 14B:
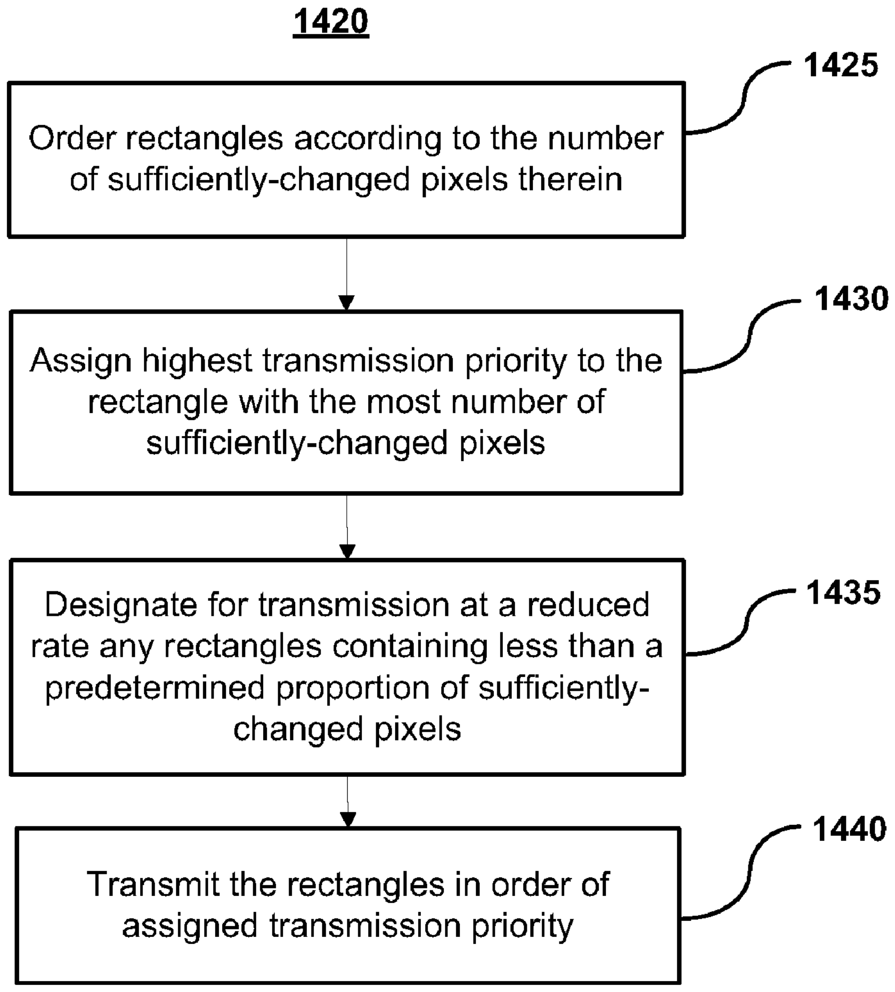
FIG. 14B is a flow chart depicting a second embodiment for transmitting information according to an embodiment of the invention.

FIGS. 14A and 14B depict embodiments of transmission methods that may be employed for improving transmission of update rectangles. It shall be noted that these embodiments may be employed following bounding of update regions, following no-cost rectangle packing, or following cost-based packing. Accordingly, the expression "rectangle" or "rectangles" shall be understood to include tightest axis-aligned bounding rectangles resulting from an update rectangle bounding method (such as method 800), rectangles resulting from a no-cost rectangle packing method (such as method 1000), and rectangles resulting from a cost-based rectangles packing method (such as method 1200).

FIG. 14A depicts a first embodiment 1400 of a transmission method. In an embodiment, the rectangles to be transmitted may be ordered (1405) according to a predetermined ordering criterion or criteria. The criteria may include, but are not limited to, the number of pixels in a rectangle that require updating, position of a rectangle, visual sensitivity of the colors in a rectangle, degree of change of the pixels in a rectangle, and the like. The rectangles may then be transmitted (1410) according to the ordering criteria.

FIG. 14B depicts an alternative embodiment 1420 of a transmission method that may be employed by transmitter 180 or system 100. The rectangles to be transmitted may be ordered (1425) according to the number of sufficiently-changed pixels in each rectangle. A highest priority transmission status may be assigned (1430) to the rectangle containing the most number of sufficiently-changed pixels from the reduce set of sufficiently-changed pixels, and the other rectangles may be ordered in decreasing order of the number of pixel they contain that also belong to the reduced set of sufficiently-changed pixels. The rectangles may be transmitted (1440) according to the priority.

In an embodiment, based on bandwidth conditions, rectangles that do not contain (1435) more than a defined number or percentage of update pixels, may be transmitted (1440) to the receiver at a slower rate. In an embodiment, low-percentage bounding rectangles may be sent on a round-robin basis so that all regions that need to be updated are guaranteed to be updated at a preset rate.

11. Transparency Encoding and Compression

In embodiments, palettizer 140 may reserve one color selection as a "transparent" color. Any pixel within a rectangle to be transmitted that is within a predetermined difference threshold of the corresponding pixel in the received image stored in received image buffer 155 may be encoded by transparency encoder 170 using the transparent color from the selection of colors in palettizer 140. That is, pixels in a rectangle that do not belong to the reduced set of sufficiently-changed pixels may be encoded as transparent. One skilled in the art shall recognize that the process of transparency encoding may produce increased compressibility because any region that is to be transmitted to a receiver but that does not require updating may be compressed using a single, transparent, color designation.

It shall be understood that transmission may include compression, which may be performed by compressor 175. In an embodiment, the compressing and transmitting may be performed by the same component, such as, for example, the transmitter 180.

Aspects of the present invention may be implemented in any device or system capable of processing the image data, including without limitation, a general-purpose computer and a specific computer intended for graphics processing. The present invention may also be implemented into other devices and systems, including without limitation, a digital camera, a multimedia device, and any other device that is capable of receiving an input image. Furthermore, within any of the devices, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application-specific integrated circuits (ASICs), programmable logic devices (PLDs), flash memory devices, and ROM and RAM devices. Examples of computer code include machine code, such as produced by a compiler, and files containing higher level code that are executed by a computer using an interpreter.

While the invention is susceptible to various modifications and alternative forms, specific examples thereof have been shown in the drawings and are herein described in detail. It should be understood, however, that the invention is not to be limited to the particular form disclosed, but to the contrary, the invention is to cover all modifications, equivalents, and alternatives falling within the scope of the appended claims.

We claim:

1. A method for improving bandwidth required to transmit at least a portion of a video stream comprising a plurality of image frames, each image frame comprising a set of pixels, the method comprising:

using an update regions finder for:

identifying a set of update pixels in a rendered image frame derived from an image frame of the video stream by comparing pixels in the rendered image frame with corresponding pixels in a stored image frame, the stored image frame representing a current state of an image frame at a receiver;

using an edge position mask derived from edge pixels in the stored image frame to generate a reduced set of update pixels by removing from the set of update pixels any pixels that exist in the edge position mask;

forming a plurality of update rectangles wherein each update rectangle comprises at least a portion of the reduced set of update pixels; and responsive to being able to improve the bandwidth required to transmit the plurality of update rectangles by merging at least two update rectangles.

2. The method of claim 1 further comprising the step of:

responsive to an update rectangle comprising a set of non-update pixels, encoding each pixel in the set of non-update pixels with a transparent color value.

3. The method of claim 1, wherein the rendered image frame is derived from an image frame by performing the steps comprising:

using a temporal filter that temporally filters the set of pixels across at least some of the plurality of image frames to create a temporally filtered image frame; and obtaining a rendered image frame by applying a palettizer to an image derived from the temporally filtered image frame.

4. The method of claim 2, wherein the step of using a temporal filter comprises:

responsive to a different between a pixel value from the image frame and a mean pixel value corresponding to that pixel location exceeding a threshold value, setting the pixel value as a new mean pixel value; and responsive to a different between a pixel value from the image frame and a mean pixel value corresponding to that pixel location not exceeding a threshold value, calculating a new mean pixel value from the mean pixel value and the pixel value;

using the new mean pixel value at each pixel location to form the temporally filtered image frame.

5. The method of claim 1, wherein the edge position mask is derived from edge pixels in the stored image frame by performing the steps comprising:

identifying a set of edge pixel in the stored image frame; and applying a morphological operator to dilate the set of edge pixels to obtain the edge position mask.

6. The method of claim 1 wherein the step of forming a plurality of update rectangles comprises the steps of:

partitioning the rendered image frame into a set of tiles; and within each tile that comprises at least a portion of the reduced set of update pixels, forming at least one tightest axis-aligned bounding rectangle that bounds the at least a portion of the reduced set of update pixels.

7. The method of claim 6 further comprising:

responsive to a plurality of tightest axis-aligned bounding rectangle being formed, ordering the tightest axis-aligned rectangles according to an ordering criteria; and transmitting the tightest axis-aligned bounding rectangles according to the ordering thereof.

8. The method of claim 7, wherein the ordering criteria is the number of pixels from the reduced set of update pixels that are within a tightest axis-aligned bounding rectangle in which a tightest axis-aligned bounding rectangle with more pixels from the reduced set of update pixels has a higher priority than a tightest axis-aligned bounding rectangle with fewer pixels from the reduced set of update pixels; and the step of transmitting comprises:

transmitting the tightest axis-aligned bounding rectangles in order of priority; and designating for transmission at a reduced rate any tightest axis-aligned bounding rectangle containing less than a predetermined proportion of pixels from the reduced set of update pixels.

9. The method of claim 1, wherein the step of responsive to being able to improve the bandwidth required to transmit the plurality of update rectangles by merging at least two update rectangles, merging the at least two update rectangles, comprises:

identifying a pair of update rectangles that are adjacent and share opposed boundary coordinates;

merging the pair of update rectangles into one update rectangle; and iterating the above identifying and merging steps using until no additional merges are identified.

10. The method of claim 9 further comprising:

identifying a cost-based rectangle bounding a set of update rectangles and at least one non-update region;

calculating a transmission cost for the cost-based rectangle;

calculating a transmission cost for the set of update rectangles; and responsive to the transmission cost for the cost-based rectangle being less than the transmission cost for the set of update rectangles, merging the set of update rectangles and the at least one non-update region into one update rectangle.

11. A computer-readable medium comprising one or more sequences of instructions to direct a computer to perform at least the steps of claim 1.

12. A method for improving bandwidth required to transmit at least a portion of a video stream comprising a plurality of image frames, each image frame comprising a set of pixels, the method comprising:

using a temporal filter for temporally filtering the set of pixels of an image frame of the video stream across at least some of the plurality of image frames to create a temporally filtered image frame;

applying a palettizer to an image frame derived from the temporally filtered image frame to obtain a rendered image frame;

using an update regions for:

identifying a set of update pixels in the rendered image frame by comparing pixels in the rendered image frame with corresponding pixels in a stored image frame, the stored image frame representing a current state of an image frame at a receiver;

using an edge position mask derived from edge pixels in the stored image frame to generate a reduced set of update pixels by removing from the set of update pixels any pixels that exist in the edge position mask;

forming a plurality of update rectangles wherein each update rectangle comprises at least a portion of the reduced set of update pixels;

responsive to being able to improve the bandwidth required to transmit the plurality of update rectangles by merging at least two update rectangles; and responsive to an update rectangle comprising a set of non-update pixels, encoding each pixel in the set of non-update pixels with a transparent color value.

13. The method of claim 12 further comprising:

applying mode-specific processing to the temporally filtered image frame to obtain the image frame derived from the temporally filtered image.

14. The method of claim 13, wherein the step of applying mode-specific processing comprises applying a non-photorealistic processing mode.

15. The method of claim 14, wherein the non-photorealistic processing mode is an edge outline mode comprises:

identifying edge pixels and non-edge pixels in the temporally filtered image frame;

setting all non-edge pixels in the temporally filtered image frame to white;

generating a grayscale histogram of edge pixels in the temporally filtered image frame;

equalizing the grayscale histogram between an upper percentile cutoff and a lower percentile cutoff to produce an equalized histogram; and using the equalized grayscale histogram to map the color of edge pixels to an equalized gray color value.

16. The method of claim 15, wherein the non-photorealistic processing mode is a cartoon mode comprises:

identifying all connected regions of non-edge pixels in the temporally filtered image frame;

for each connected region, setting the color of the non-edge pixels in the connected region as an average color value of that connected region; and setting the color value of the edge pixels to a color value obtained by alpha-blending an edge pixel's color with an average color value of an immediately adjacent connected region.

17. A medium or waveform comprising one or more sequences of instructions to direct an instruction-executing device to perform at least the steps of claim 12.

18. A system for improving bandwidth required to transmit at least a portion of a video stream comprising a plurality of image frames, each image frame comprising a set of pixels, the system comprising:

a temporal filter, communicatively coupled to receive the video stream, that temporally filters an image frame in the video stream into a temporally filtered image frame;

a palettizer, communicatively coupled to receive a rendered image frame derived from the temporally filtered image frame, that maps color values of pixels in the rendered image frame to a discrete number of colors to form a palettized image frame;

a palettized image frame buffer, communicatively coupled to the palettizer, that receives the palettized image frame from the palettizer;

a received image frame buffer that contains a stored image frame representing a current state of an image frame at a receiver;

a position mask computer, communicatively coupled to the received image frame buffer, that derives an edge position mask from edge pixel positions in the stored image frame;

an update regions finder, communicatively coupled with the received image frame buffer and the position mask computer, that identifies a set of update pixels in the palettized image frame by comparing pixels in the palettized image frame with corresponding pixels in a stored image frame, that uses the edge position mask to generate a reduced set of update pixels by removing from the set of update pixels any pixels that exist in the edge position mask, and that forms a plurality of update rectangles wherein each update rectangle comprises at least a portion of the reduced set of update pixels; and a rectangle packer, coupled to update regions finder, that, responsive to being able to improve the bandwidth required to transmit the plurality of update rectangles by merging at least two update rectangles.

19. The system of claim 18, further comprising:

a transparency encoder, coupled to the rectangle packer, that, responsive to an update rectangle comprising a set of non-update pixels, encodes each pixel in the set of non-update pixels with a transparent color value.

20. The system of claim 18, further comprising:

an edge position computer, communicatively coupled to the temporal filter, that identifies a set of edge pixels in the temporally filtered image frame; and a mode-specific processing section, communicatively coupled to the temporal filter and the edge position computer, that uses the set of edge pixels and the temporally filtered image frame to process the temporally filtered image frame according to a selected non-photorealistic mode.

* * * * *

UNITED STATES PATENT AND TRADEMARK OFFICE

CERTIFICATE OF CORRECTION

PATENT NO. : 7,734,088 B2
APPLICATION NO. : 11/622316
DATED : June 8, 2010
INVENTOR(S) : Anoop K. Bhattacharjya et al.

It is certified that error appears in the above-identified patent and that said Letters Patent is hereby corrected as shown below:

Column 17, Line 6 “after regions” insert --finder--

Signed and Sealed this

Twenty-fourth Day of August, 2010

David J. Kappos
*Director of the United States Patent and Trademark Office*